(12) United States Patent
Kwolek (10) Patent No.: US 8,020,913 B2
(45) Date of Patent: Sep. 20, 2011

(54) VEHICLE INTERIOR STRUCTURAL ASSEMBLY

(75) Inventor: Chad Kwolek, Hartland, MI (US)

(73) Assignee: Nissan North America, Inc., Franklin, TN (US)

( * ) Notice: Subject to any disclaimer, the term of this patent is extended or adjusted under 35 U.S.C. 154(b) by 31 days.

(21) Appl. No.: 12/697,930

(22) Filed: Feb. 1, 2010

(65) Prior Publication Data

US 2011/0187144 A1     Aug. 4, 2011

(51) Int. Cl.
    *B62D 25/14*     (2006.01)
(52) U.S. Cl. .............................. 296/70; 296/72; 180/90
(58) Field of Classification Search .................. 296/70, 296/72, 37.12; 180/90
    See application file for complete search history.

(56) References Cited

U.S. PATENT DOCUMENTS

| 4,767,153 | A |   | 8/1988 | Kawasaki et al. |       |
|-----------|---|---|--------|-----------------|-------|
| 5,931,520 | A | * | 8/1999 | Seksaria et al. | 296/70 |
| 6,170,787 | B1 |  | 1/2001 | Morgan          |       |
| 7,210,723 | B2 |  | 5/2007 | Sugawara et al. |       |
| 7,270,363 | B1 | * | 9/2007 | Hanson et al.  | 296/70 |
| 7,513,549 | B2 |  | 4/2009 | Tomasson et al. |       |
| 2009/0108617 | A1 | * | 4/2009 | Songwe, Jr.  | 296/70 |
| 2009/0108618 | A1 | * | 4/2009 | Hanson et al. | 296/72 |
| 2010/0219653 | A1 | * | 9/2010 | Kwolek        | 296/72 |

* cited by examiner

*Primary Examiner* — Dennis Pedder
(74) *Attorney, Agent, or Firm* — Global IP Counselors, LLP (57) ABSTRACT

A vehicle interior structural assembly includes an instrument panel that is dimensioned to extend laterally between opposing interior side walls of a passenger compartment of a vehicle. A structural member extends between first and second ends of the instrument panel such that the structural member is substantially concealed by the instrument panel. A stay bracket is connected to the structural member and extends downward from the structural member. The stay bracket is located forward of a rearmost extent of the instrument panel. A reinforcement member is connected to the stay bracket at a first point and a second point that are vertically spaced from one another. The reinforcement member includes a support portion cantilevered from and extending rearward of the rearmost extent of the instrument panel such that forces applied to the reinforcement member are directed to the stay bracket and the structural member.

20 Claims, 12 Drawing Sheets

VEHICLE INTERIOR STRUCTURAL ASSEMBLY

BACKGROUND

1. Field of the Invention

The present invention generally relates to a vehicle interior structural assembly. More specifically, the present invention relates to a vehicle interior structural assembly that includes a central section of a dashboard that is spaced apart from the floor of the vehicle interior.

2. Background Information

The passenger compartment or cockpit area of a vehicle typically includes a center console. The center console is typically mounted to the floor of the vehicle and includes cup holder sections. Such a center console blocks egress between the front seats of the vehicle and the space behind the front seats.

SUMMARY

One object of the present invention is to provide a vehicle interior cockpit with a cantilevered dashboard extension that is spaced apart from the floor of the vehicle interior cockpit.

In view of the state of the known technology, in one aspect of the invention, a vehicle interior structural assembly includes an instrument panel with a main section, a structural member, a stay bracket and a reinforcement member. The main section of the instrument panel has a first end and a second end dimensioned to extend laterally between opposing interior side walls of a passenger compartment of a vehicle. The structural member extends between the first and second ends of the instrument panel such that the structural member is substantially concealed by the instrument panel. The stay bracket has a first end connected to the structural member. The stay bracket extends downward from the structural member and is located forward of a rearmost extent of the instrument panel. The reinforcement member is connected to the stay bracket at a first point and a second point that are vertically spaced from one another. The reinforcement member includes a support portion cantilevered from and extending rearward of the main section of the instrument panel such that forces applied to the reinforcement member are directed to the stay bracket and the structural member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
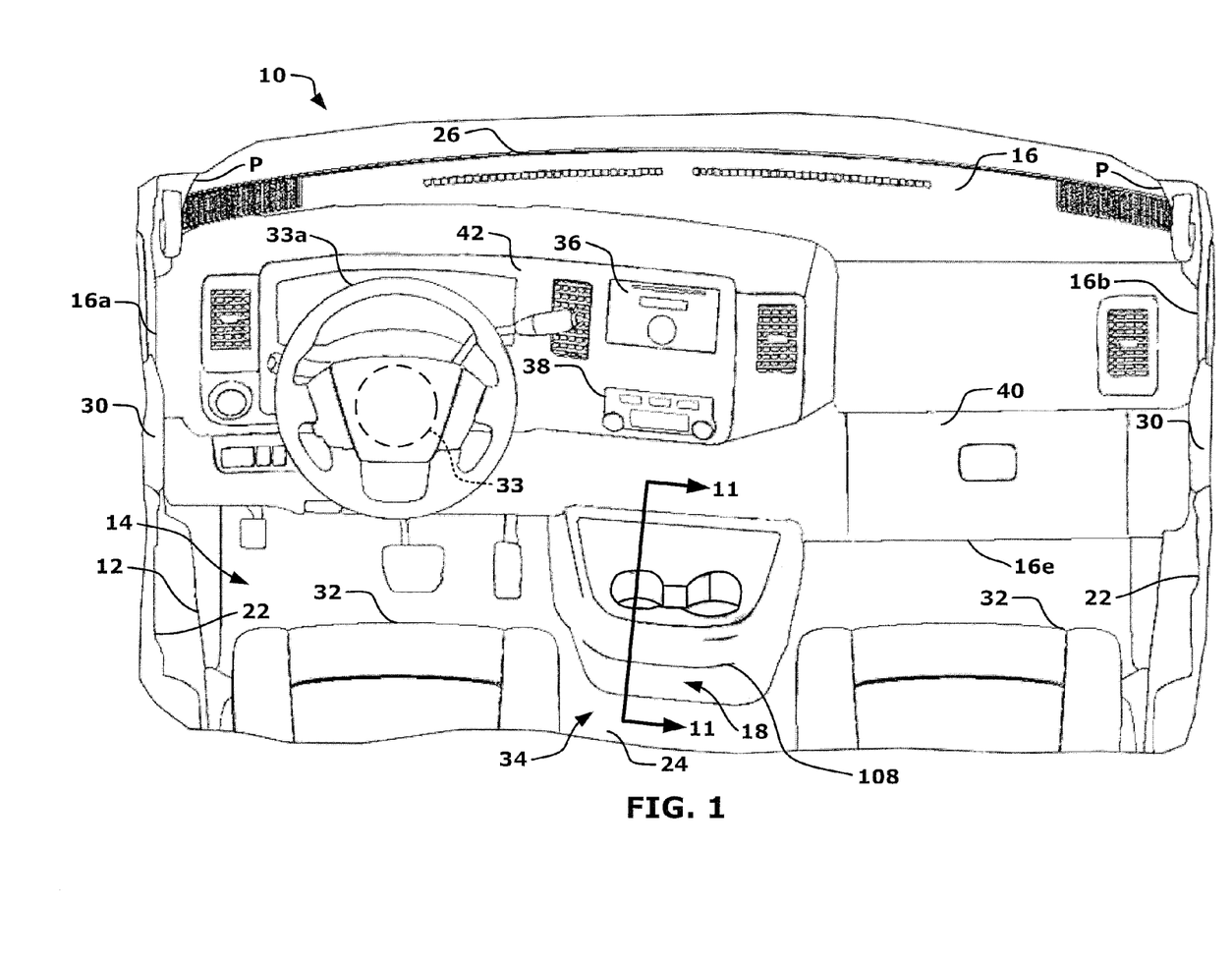
FIG. 1 is a perspective view of a vehicle passenger compartment showing a floor, a pair of seats, side walls, an instrument panel extending between the side walls and a cantilevered section extending rearward from the instrument panel to a space between the seats in accordance with one embodiment.

Referring initially to FIG. 1, a vehicle 10 is illustrated in accordance with a first embodiment. The vehicle 10 includes a body structure 12 that includes a passenger compartment 14 that is provided with an instrument panel 16 having a cantilevered section 18 that is described in greater detail below.

Figure 2:
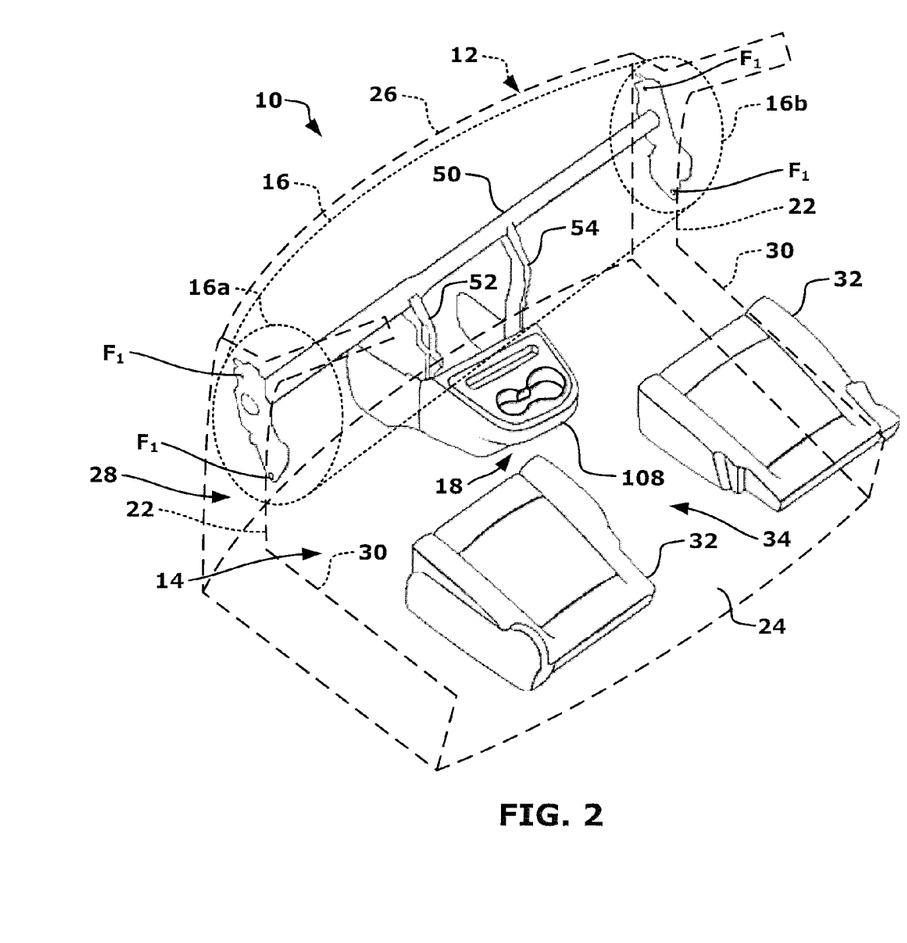
FIG. 2 is another perspective view of the vehicle passenger compartment, showing the floor and the sidewalls with portions of the dashboard removed to reveal a support member that extends between the sidewalls that is otherwise concealed by the dashboard, with the cantilevered section being cantilevered from the support member in accordance with the one embodiment.

As best shown in FIG. 2, the body structure 12 includes, among other things, A-pillars P, a pair of side walls 22, a floor 24, a windshield support section 26 and a dividing wall 28 below the windshield support section 26. The pair of side walls 22 is interrupted by a pair of door openings 30. The dividing wall 28 separates the passenger compartment 14 from an engine compartment (not shown) of the vehicle 10. In FIG. 2, only those portions of the side walls 22 forward from the door openings 30 are depicted. The pair of side walls 22, the floor 24 and the dividing wall 28 partially surround and at least partially confine the passenger compartment 14 in a conventional manner. Since the A-pillars P, the pair of side walls 22, the floor 24, the windshield support section 26, the dividing wall 28 and the pair of door openings 30 are conventional features of the vehicle 10, further description is omitted for the sake of brevity.

As indicated in FIGS. 1 and 2, the passenger compartment 14 includes a pair of seats 32 that are spaced apart from one another and are installed to the floor 24 in a conventional manner. The space between the seats 32 defines an egress 34 through which a driver or passenger within the vehicle 10 can move between the area in front of the seats 32 to an area behind the seats 32 without interference from the seats 32.

As shown in FIG. 1, the instrument panel 16 is installed within the passenger compartment 14 with a steering column 33 and steering wheel 33a extending rearward through the instrument panel. More specifically, the instrument panel 16 is fixed to the side walls 22 and the dividing wall 28, as indicated in FIG. 2. The instrument panel 16 is fixed to the side walls 22 and the dividing wall 28 by, for example, fasteners (not shown).

As indicated in FIG. 1, the instrument panel 16 has a first end 16a and a second end 16b dimensioned to extend laterally between the side walls 22 (opposing interior side walls of the passenger compartment 14). The cantilevered section 18 extends rearwardly from a central portion of the instrument panel 16 into at least a portion of the egress 34 between the seats 32. The instrument panel 16 and the cantilevered section 18 are dimensioned to allow passage between the seats 32 and the egress 34. More specifically, the cantilevered section 18 is dimensioned to allow the driver or passenger within the vehicle 10 to move between the area in front of the seats 32 and the area behind the seats 32 through the egress 34 with minimal interference from the cantilevered section 18, as is described in greater detail below.

As indicated in FIG. 1, the instrument panel 16 includes a variety of features, such as a radio section 36, a heating/AC control section 38, a glove compartment section 40, an instrument panel section 42 and the cantilevered section 18. The radio section 36, the heating/AC control section 38, the glove compartment section 40 and the instrument panel section 42 define a main section of the instrument panel 16. More specifically, those portions of the instrument panel 16 other than the cantilevered section 18 and the steering column 33 (and steering wheel 33a) constitute the main section of the instrument panel 16. The radio section 36, the heating/AC control section 38, the glove compartment section 40 and the instrument panel section 42 are all conventional features. Therefore further description of these conventional features is omitted for the sake of brevity.

Although the cantilevered section 18 of the instrument panel 16 has the appearance of being a part of the instrument panel 16, the cantilevered section 18 can be independently supported to the body structure 12. More specifically, the cantilevered section 18 is supported to the body structure 12 via structure that can be separate from the instrument panel 16, as is described in greater detail below. It should be understood from the drawings and the description herein that the cantilevered section 18 can be connected to the instrument panel 16. However, a separate support structure is provided for the cantilevered section 18 that supports loads applied to the cantilevered section 18. In other words, loads applied to the cantilevered section 18 are transferred to the body structure 12 but are not necessarily transferred through or to the instrument panel 16.

Figure 3:
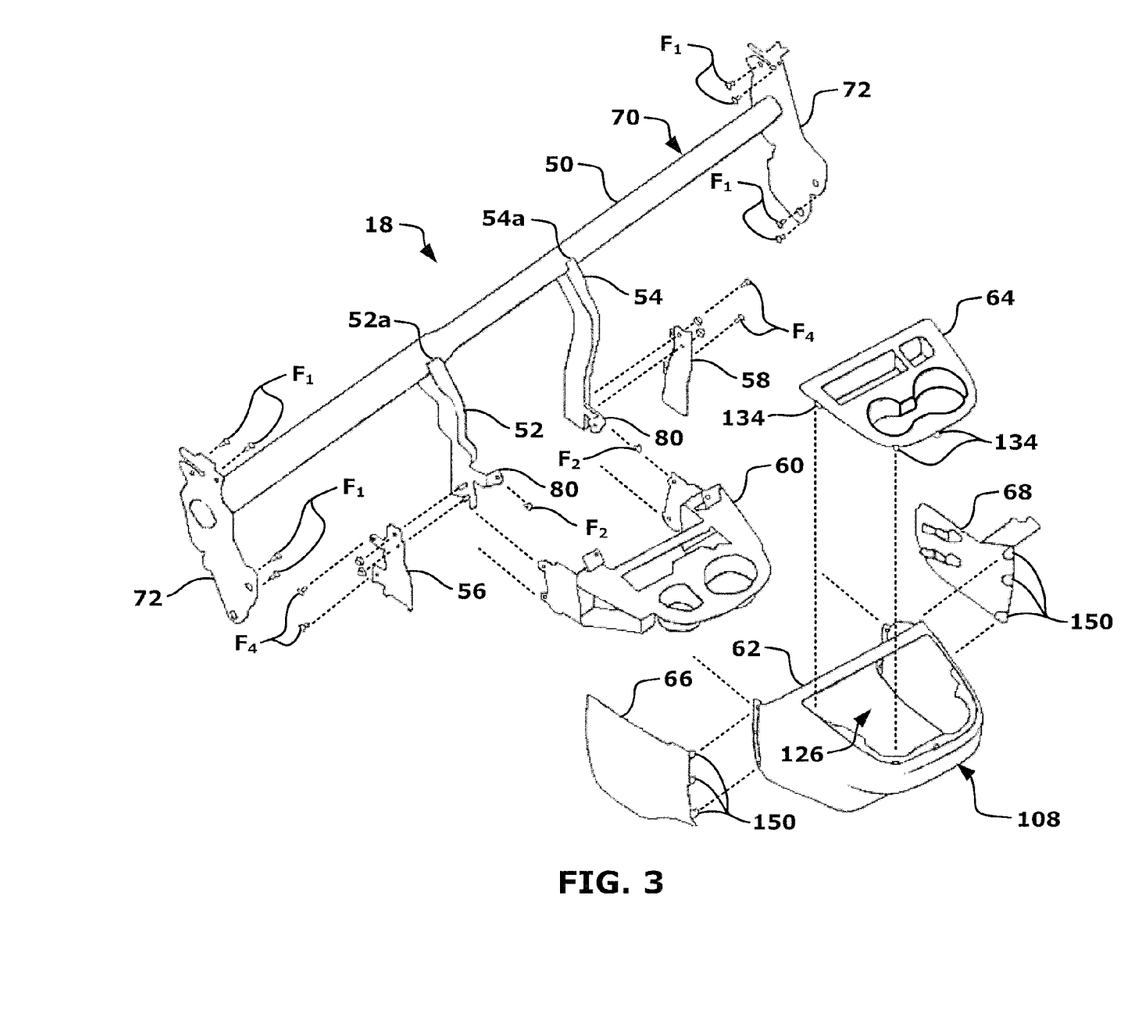
FIG. 3 is an exploded view of the cantilevered section, showing the support member, stay brackets, a reinforcement member and trim components in accordance with the one embodiment.

As is best shown in FIG. 3, the cantilevered section 18 includes a structural assembly 50, a pair of stay brackets 52 and 54, a pair of stay members 56 and 58, a reinforcement member 60 and trim component 62, 64, 66 and 68.

Figure 10:
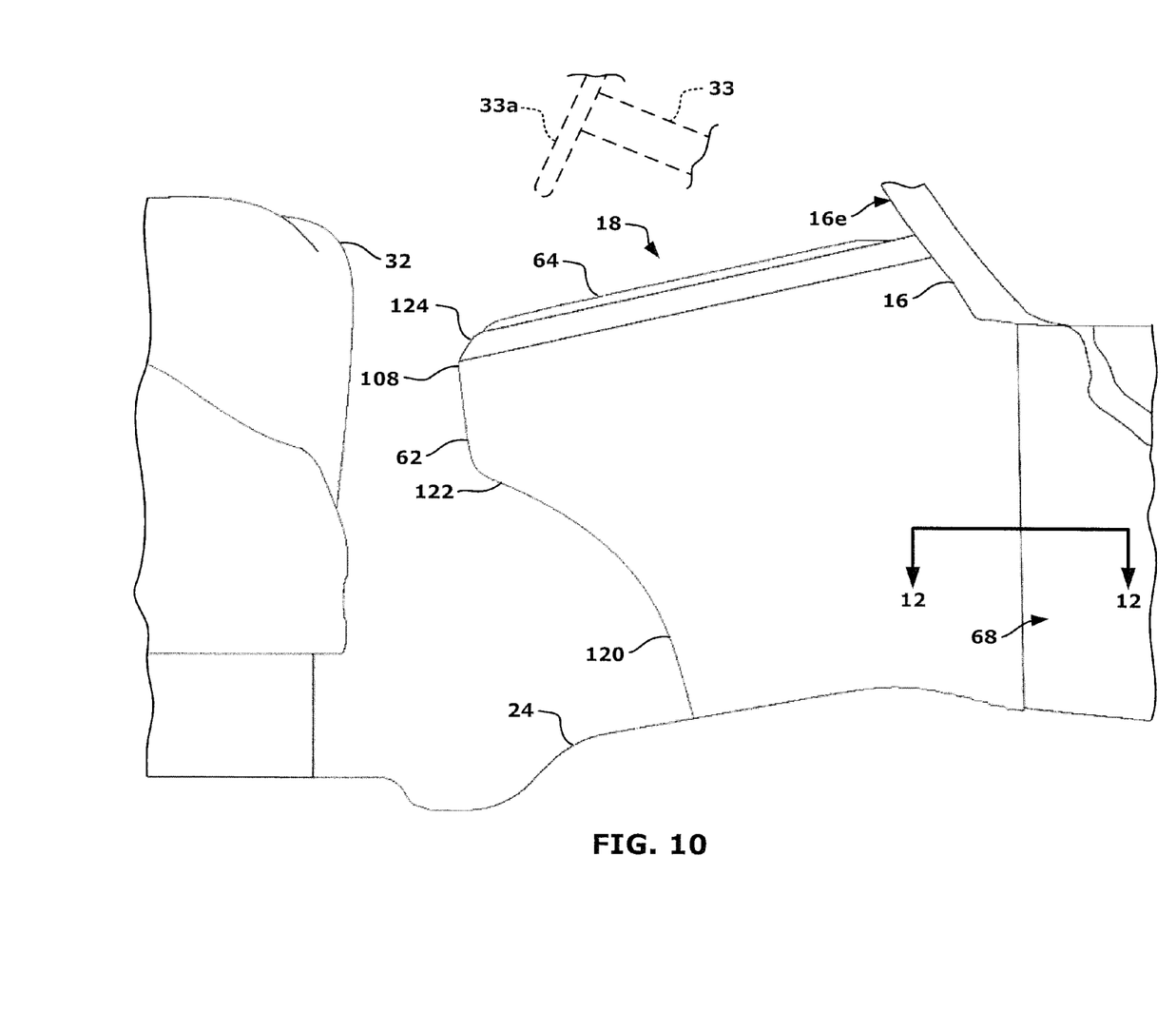
FIG. 10 is a side elevation view of the passenger compartment showing the floor, one of the seats, and the cantilevered section in accordance with the one embodiment.

The structural assembly 50 (a structural member) is dimensioned to extend between the side walls 22 and the first and second ends 16a and 16b of the instrument panel 16. Further, as is evident in FIG. 1, the structural assembly 50 (the structural member) is substantially concealed by the instrument panel 16. Further, as indicated in FIGS. 2 and 10, all elements of the structural assembly 50 except the stay members 56 and 58, are located above the floor 24 and are spaced apart from the floor 24 by at least a distance D (shown in FIG. 7). As shown in the drawings, the stay members 56 and 58 can contact and/or be fixedly connected to the floor 24. However, it should be understood from the drawings and the description herein that the stay members 56 and 58 can alternatively be free from contact and connection with the floor 24.

Figure 4:
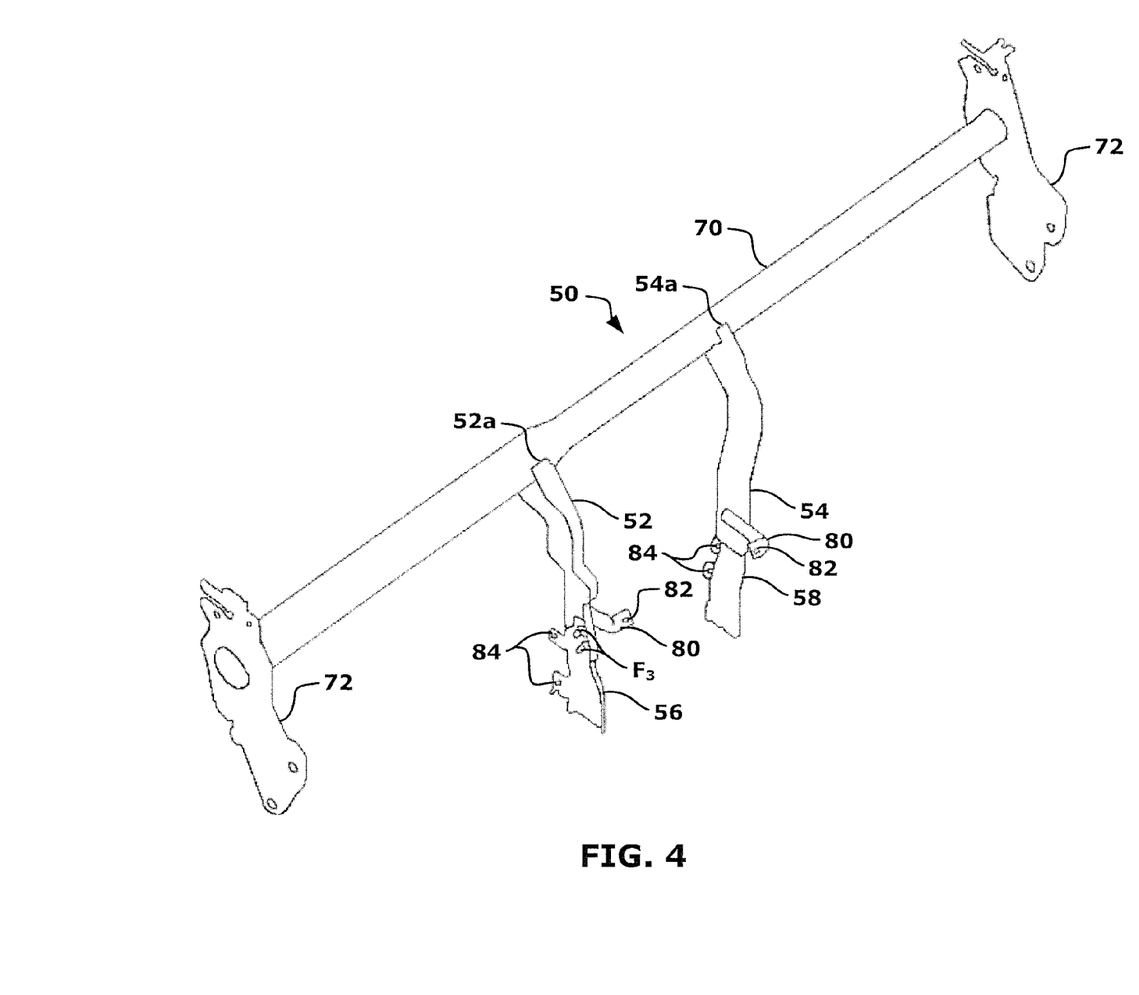
FIG. 4 is a perspective view of the support member shown removed from the vehicle interior cockpit area showing the stay brackets and stay members of the support member in accordance with the one embodiment.

As is best shown in FIGS. 3 and 4, the structural assembly 50 includes a main section 70, side brackets 72 and the stay brackets 52 and 54. The structural assembly 50 is made of steel or other similar rigid metal, but can alternatively be made of a rigid plastic or composite material that exhibits the same structural rigidity as a metallic material. The main section 70 is depicted as a generally tubular shaped element with a hollow interior. However, the main section 70 can alternatively have a rectangular or square shape in cross-section, with a hollow interior. In other words, the main section 70 can have any of a variety of shapes in cross-section that provide rigidity and that can support the cantilevered section 18. More specifically, the main section 70 is dimensioned to be rigid when installed within the vehicle 10.

As best shown in FIGS. 3 and 4, the side brackets 72 are welded or otherwise rigidly fixed to the main section 70. The side brackets 72 extend in directions perpendicular to a lengthwise direction of the main section 70. The side brackets 72 include a plurality of apertures that receive fasteners $F_1$ (FIGS. 2 and 3 only) that fixedly attach the side brackets 72 to the side walls 22 of the body structure 12 of the vehicle 10. When the side brackets 72 are installed to the side walls 22, the structural assembly 50 cannot rotate relative to the side walls 22, but rather is rigidly fixed in position within the passenger compartment 14 and concealed by the instrument panel 16, as indicated in FIG. 2.

The stay brackets 52 and 54 have respective upper ends 52a and 54a. The stay brackets 42 and 54 are contoured members that are welded or otherwise rigidly fixed to a central portion of the main section 70 of the structural assembly 50. More specifically, the upper ends 52a and 54a of the stay brackets 52 and 54 are fixedly connected to the structural member 50.

Figure 7:
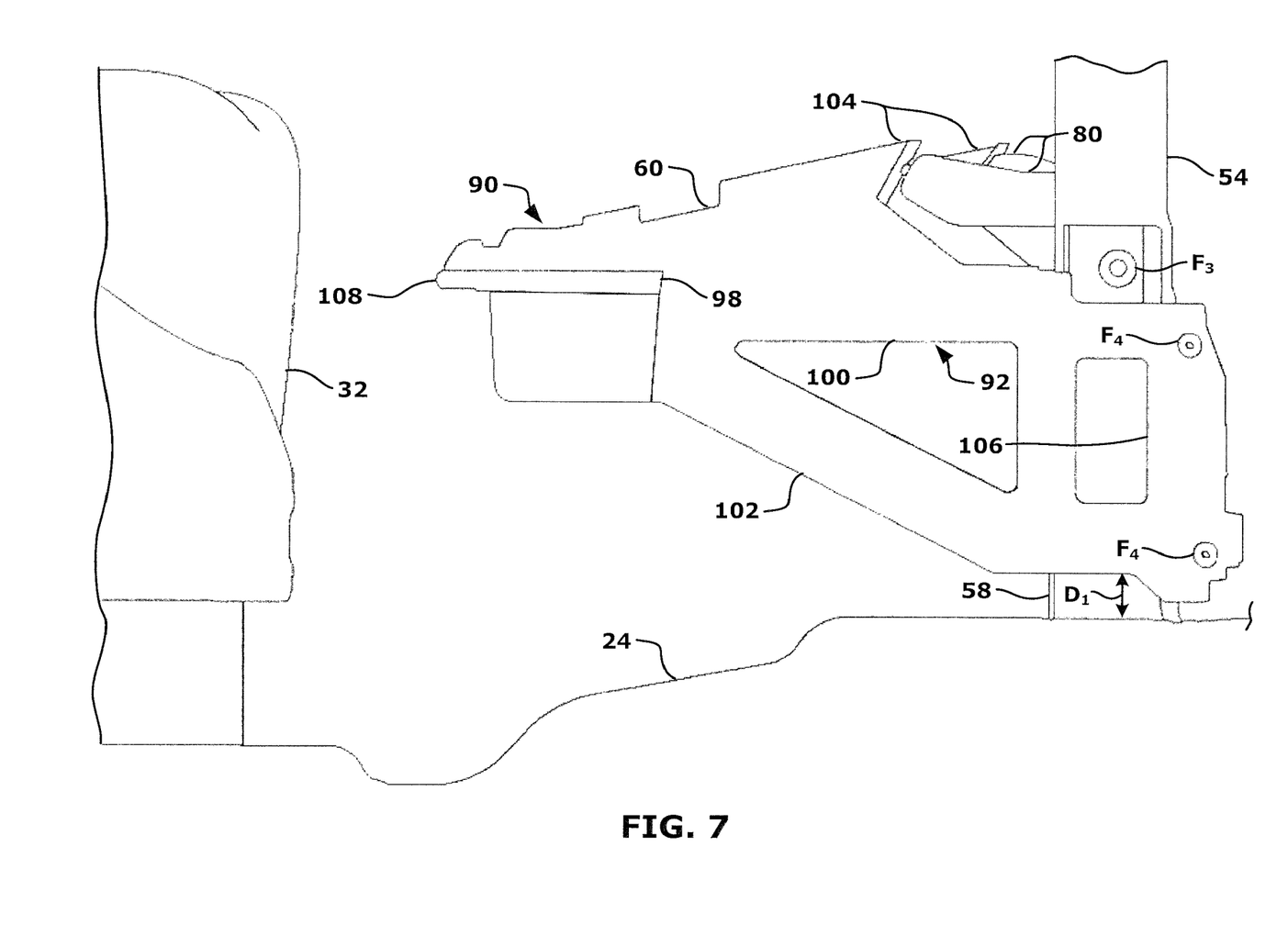
FIG. 7 is a side elevation view of the cantilevered section showing the stay members and the reinforcement member in accordance with the one embodiment.

The stay brackets 52 and 54 are spaced apart from one another, as shown in FIGS. 3 and 4. The stay brackets 52 and 54 preferably have a U-shape when viewed in cross-section such that the stay brackets 52 and 54 remain rigid relative to the main section 70. The stay brackets 52 and 54 are preferably symmetrically shaped with respect to one another, both extending rigidly downward and slightly rearward from the main section 70 of the structural member 50. The shape of the stay brackets 52 and 54 can vary, depending upon the overall vehicle design and the shape and design of the cantilevered section 18. However, in the depicted embodiment, the stay brackets 52 and 54 are located forward of a rear end of the main section of the instrument panel 16, as indicated in FIG. 2. Further, the stay brackets 52 and 54 are free from contact with the floor 24 of the passenger compartment 14 of the vehicle 10, as indicated in FIG. 7.

Each of the stay brackets 52 and 54 include a center bracket 80 that extends rearward from the stay brackets 52 and 54. Each of the center brackets 80 includes at least one aperture 82 that receives a fastener $F_2$ (shown in FIG. 3) for attachment to the reinforcement member 60, as described in greater detail below.

Figure 5:
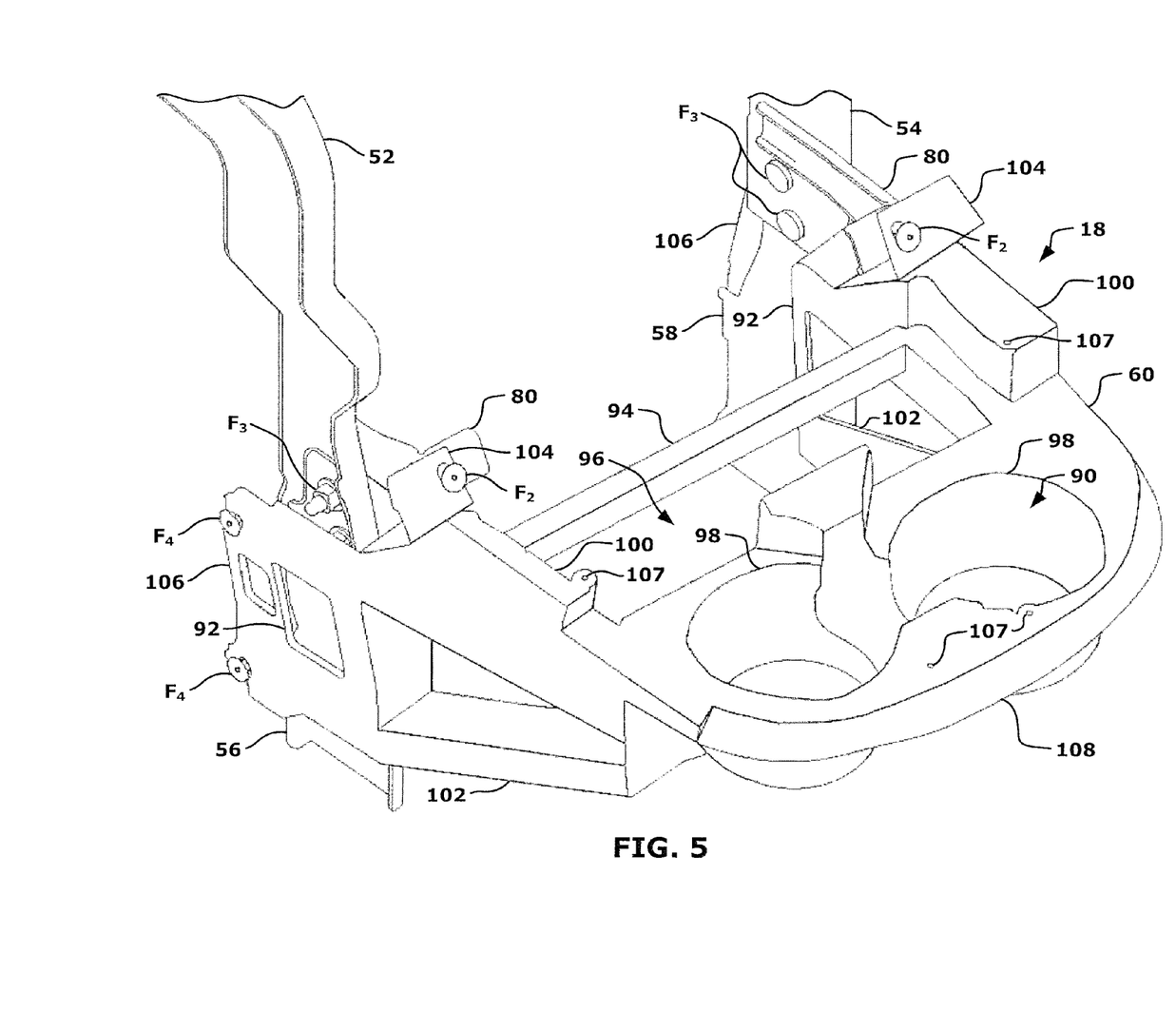
FIG. 5 is a perspective view of a portion of the cantilevered section showing the stay members and the reinforcement member in accordance with the one embodiment.

As best shown in FIG. 4, the stay members 56 and 58 are brackets or plate-like members that are attached to respective ones of the stay brackets 52 and 54 by fasteners $F_3$, as indicated in FIG. 5. The stay members 56 and 58 are depicted as separate members from the stay brackets 52 and 54. However, it should be understood from the drawings and the description herein that the stay members 56 and 58 can alternatively be unitarily formed with respective ones of the stay brackets 52 and 54. Still further, the stay members 56 and 58 can also be welded or otherwise rigidly fixed to respective ones of the stay brackets 52 and 54.

Each of the stay members 56 and 58 includes apertures 84 that receive fasteners F4 (shown in FIGS. 4 and 5) that attach the reinforcement member 60 to the stay members 56 and 58. The fasteners $F_4$ (fastener parts) are oriented parallel to the main section 70 of the structural member 50.

Figure 6:
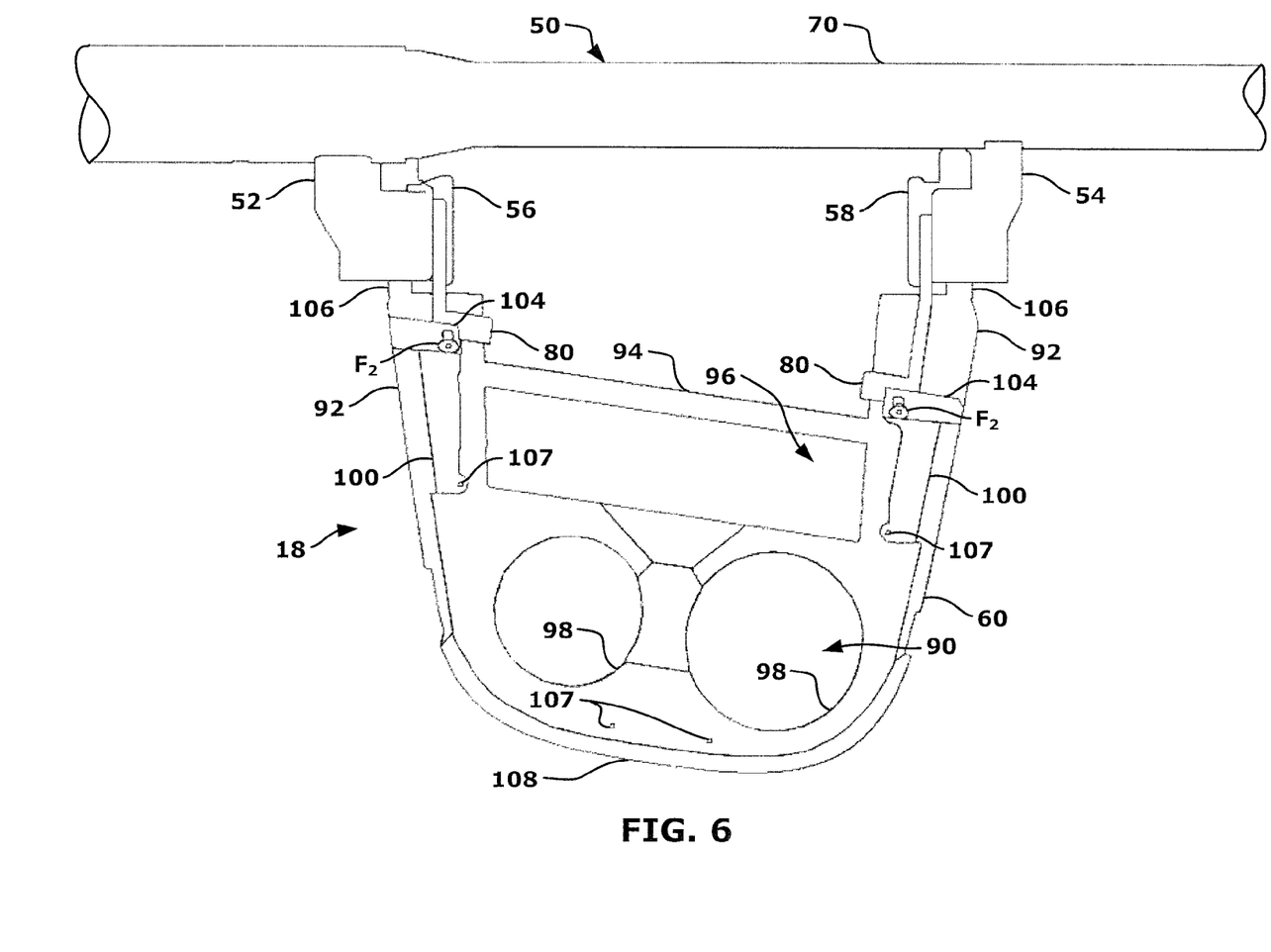
FIG. 6 a top view of the portion of the cantilevered section showing the stay members and the reinforcement member depicted in FIG. 5 in accordance with the one embodiment.

A description of the reinforcement member 60 is now provided with respect to FIGS. 5, 6 and 7. The reinforcement member 60 is preferably a single member that is unitarily formed of, for example, molded plastic, polymer material, composite materials, or other similar structural material that can withstand forces generally associated with passenger use of an instrument panel 16. For example, the reinforcement member 60 is dimensioned and configured to withstand a passenger leaning, sitting or stepping on it and to withstand placement of small heavy objects thereon.

The reinforcement member 60 basically includes a cup holder section 90, side support sections 92, a transverse brace member 94 and a storage aperture 96 that is defined between the cup holder section 90, the side support sections 92 and the transverse brace member 94.

The cup holder section 90 (a support portion) preferably includes a pair of cup holder contoured parts 98. However, it should be understood from the drawings and the description herein that any number of cup holder contoured parts can be provided. For example, the cup holder section 90 can be shaped to receive only one cup or three cups. Thus, the cup holder section 90 is not limited to the pair of cup holder contoured parts 98 depicted in FIG. 5.

The side support sections 92 each include an upper beam part 100, a truss part 102, an attachment flange 104 and a mounting extension 106. The upper beam parts 100 are dimensioned to extend in a substantially horizontal direction with the cantilevered section 18 installed within the vehicle 10. The upper beam parts 100 further extend between the cup holder section 90 and the mounting extension 106. The truss parts 102 also extend between the cup holder section 90 and the mounting extension 106. However, the truss parts 102 are angularly offset from the upper beam parts 100, extending slightly downward from the cup holder section 90 toward the mounting extensions 106.

The attachment flanges 104 extend upward from the upper beam parts 100, with a slight angular offset from the upper beam parts 100. Each of the attachment flanges 104 include an aperture that receives one of the fasteners $F_2$, thus securing the reinforcement member 60 to the stay brackets 52 and 56 as shown in FIG. 5.

The mounting extensions 106 extend from the upper beam parts 100 and the truss parts 102. The mounting extensions 106 include apertures that receive the fasteners $F_4$, as shown in FIGS. 5 and 10. Thus, the reinforcement member 60 is fixedly and rigidly supported on the stay brackets 52 and 54 and the stay members 56 and 58 by the attachment of the fasteners $F_2$ and $F_4$.

The transverse brace member 94 extends between the side support sections 92. More specifically, the transverse brace member 94 extends between respective ones of the upper beam parts 100 of the side support sections 92. Further, the transverse brace member 94 is spaced apart from the cup holder section 90.

The side support sections 92 are spaced apart from one another. More specifically, the attachment flanges 104 and the mounting extensions 106 are spaced apart from one another. Further, the apertures that receive the fasteners $F_4$ are vertically spaced apart from one another, as shown in FIGS. 5 and 7. Therefore, the reinforcement member 60 is connected to each of the stay brackets 52 and 54 (and stay members 56 and 58) at points that are vertically spaced from one another. As well, the mounting extensions 106 are installed to respective outboard sides of the stay brackets 56 and 58.

The reinforcement member 60 further includes the side support sections 92 and the cup holder section 90 that are cantilevered from and extend rearward of the rearmost extent 16e of the main section of the instrument panel 16 as shown in FIG. 1. Therefore, the forces applied to the reinforcement member 60 are directed to the stay brackets 52 and 54 and the structural member 50. Further, as shown in FIG. 7, the reinforcement member 60 is free from contact with the floor 24 of the passenger compartment 14 of the vehicle 10.

When installed within the vehicle 10, the reinforcement member 60 is centrally located with respect to a lateral width of the passenger compartment 14 of the vehicle 10. The cup holder section 90, the upper beam parts 100 of the side support sections 92 and the transverse brace member 94 define an upward facing surface of the reinforcement member 60 that includes a plurality of fastener receiving apertures 107 (shown in FIG. 5). Further, the cup holder section 90 of the reinforcement member 60 has a distal end 108 (rearward end) that extends at least partially between seats 32 (the front seats) of the vehicle 10, as indicated in FIG. 7. Further, the distal end 108 of the reinforcement member 60 extends at least partially rearward of a rearmost extent of the steering wheel 33a within the passenger compartment 14 of the vehicle 10, as indicated in FIGS. 1 and 10.

A further description of the storage aperture 96 is provided below with a description of the trim components 62, 64, 66 and 68.

Figure 8:
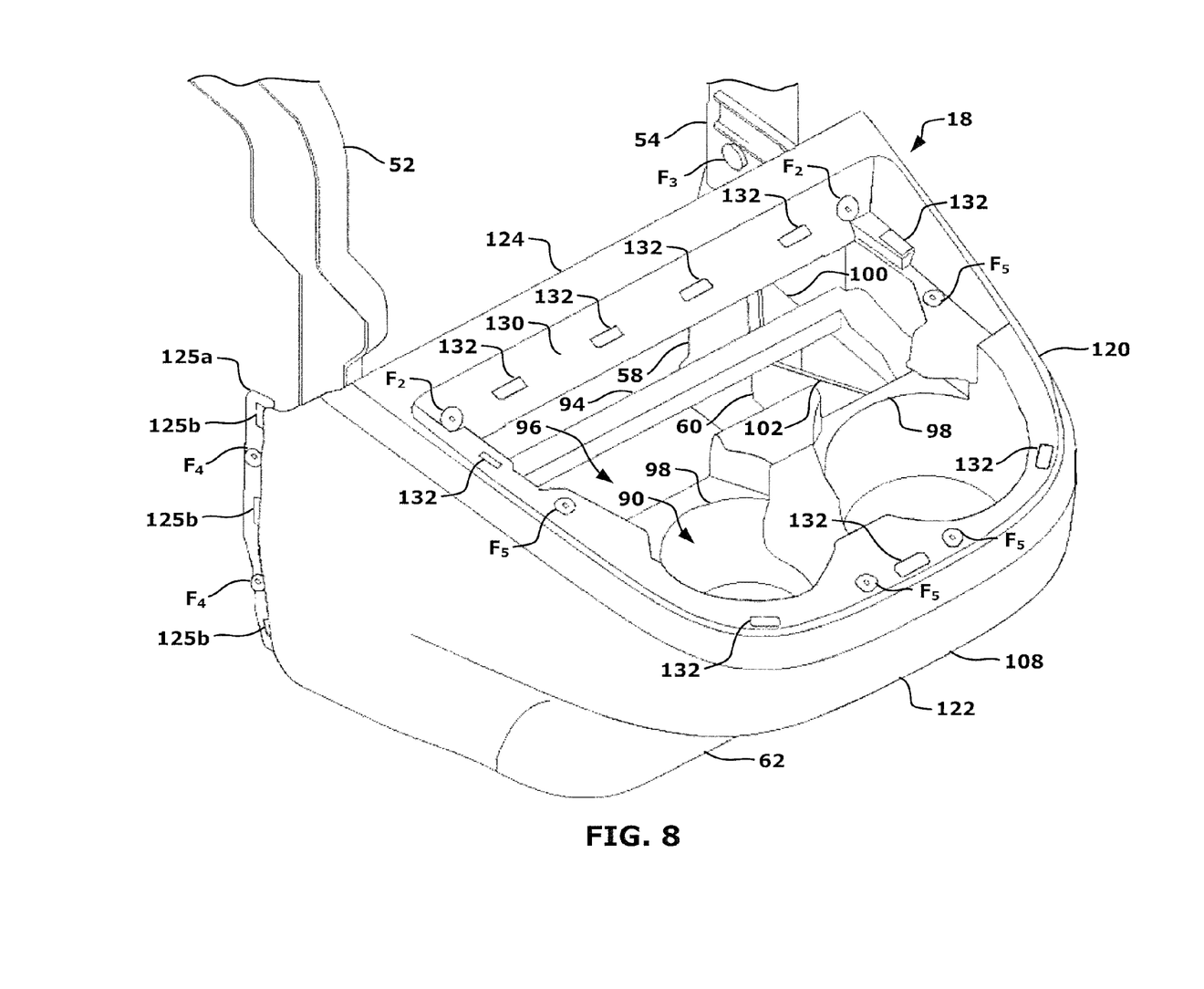
FIG. 8 is a perspective view of the cantilevered section showing one of the trim components at least partially covering the reinforcement structure, in accordance with the one embodiment.

A description of the trim components 62, 64, 66 and 68 is now provided with specific reference to FIGS. 8-12. As best shown in FIG. 8, the trim component 62 is a molded, contoured element that is shaped and dimensioned to cover and at least partially conceal the reinforcement member 60. With the trim component 64 installed (described below) the trim components 62 and 64 completely cover and conceal the reinforcement member 60.

The trim component 62 includes side sections 120, bottom section 122 and top section 124, as best shown in FIG. 8. The side sections 120 include trim extensions 125a with apertures that receive the fasteners $F_4$ and snap fit apertures 125b that support the trim components 66 and 68, as described in greater detail below.

The top section 124 includes an opening 126 (shown in FIG. 3) that leaves the cup holder contoured parts 98 of the cup holder section 90, and the storage aperture 96 of the reinforcement member 60 exposed. The trim component 62 is also provided with a plurality of apertures for receiving fasteners $F_2$ and $F_5$. Specifically, the trim component 62 is attached to the center brackets 80 of the stay brackets 52 and 54 by the fasteners $F_2$. More specifically, the fasteners $F_2$ hold the trim component 62 and the reinforcement member 60 to the center brackets 80 of the stay brackets 52 and 54. Further, the fasteners $F_5$ are installed though the apertures in the trim component 62 and extend into the fastener receiving apertures 107 of the reinforcement member 60.

Figure 9:
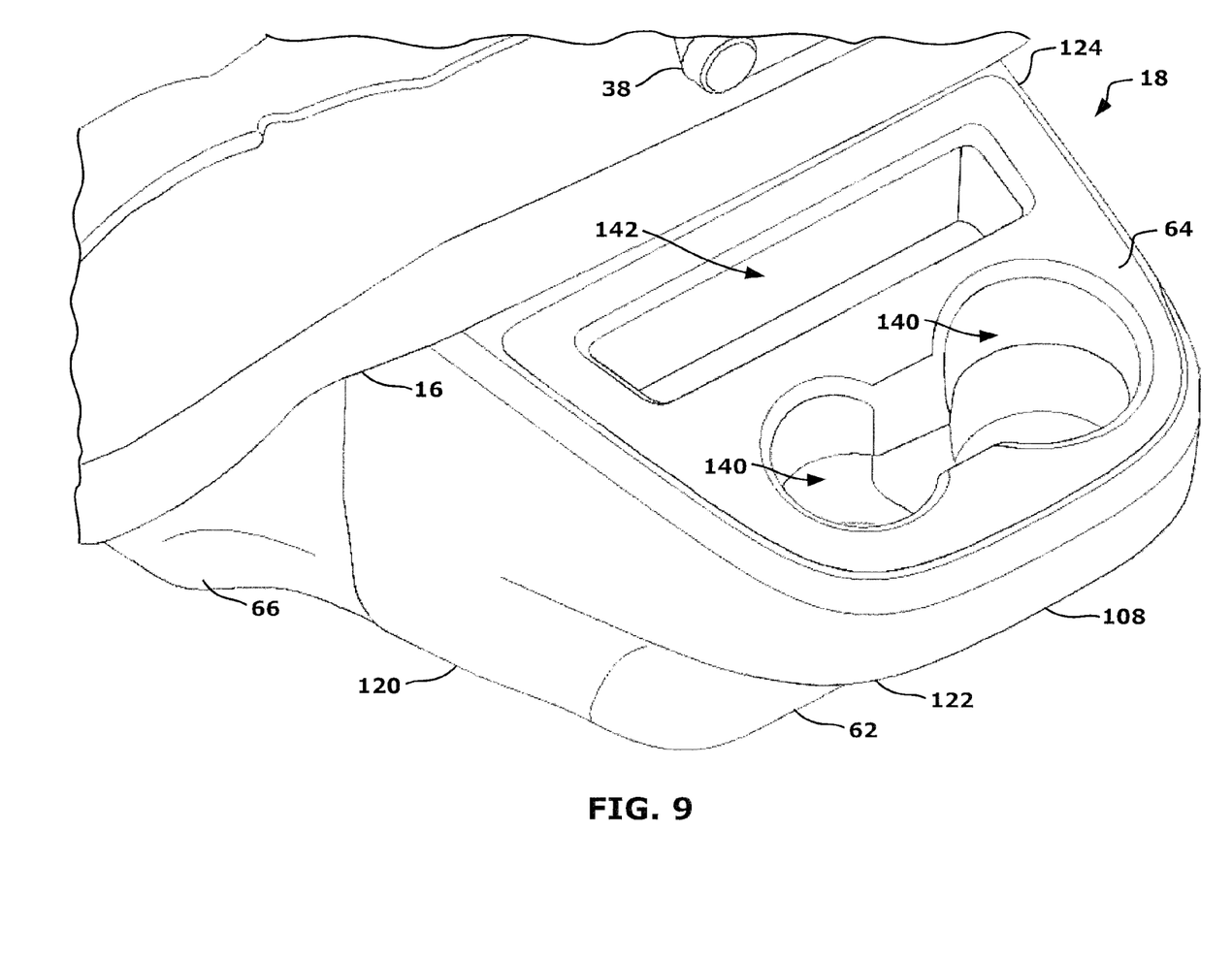
FIG. 9 is a perspective view of the cantilevered section showing all of the trim components concealing the reinforcement structure in accordance with the one embodiment.

The region around the opening 126 of the top section 124 of the trim component 62 includes a lip 130 with a plurality of snap fit openings 132. The trim component 64 is provided with a corresponding plurality of snap fitting projections 134 (shown in FIG. 3). Hence, as indicated in FIG. 9, the trim component 64 is dimensioned to snap fit into the opening 126 covering the cup holder contoured parts 98 of the cup holder section 90, and the storage aperture 96 of the reinforcement member 60.

Figure 11:
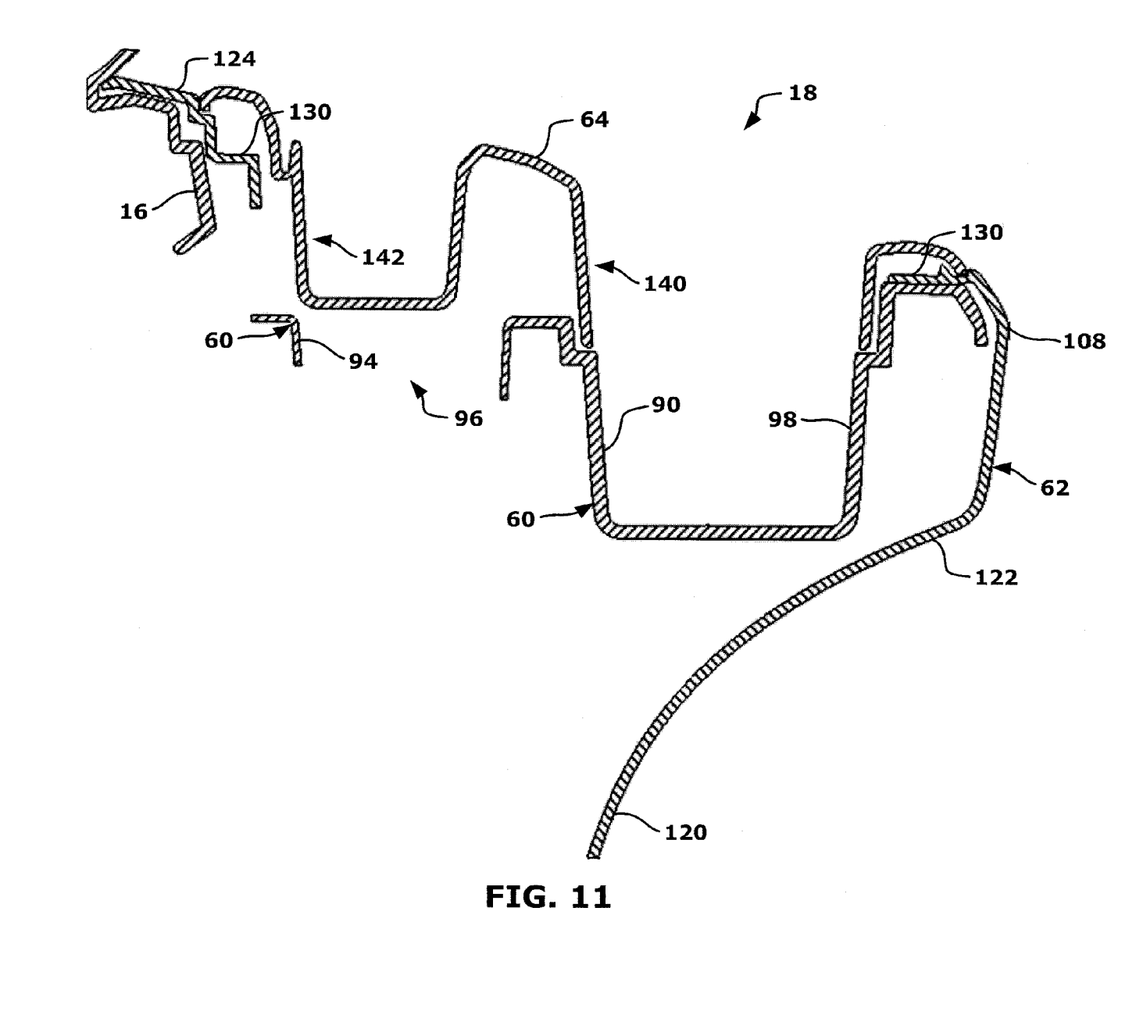
FIG. 11 is a side cross-sectional view of the cantilevered section taken along the line 11-11 in FIG. 1, showing portions of the reinforcement structure and several of the trim components of the cantilevered section in accordance with the one embodiment.
Figure 12:
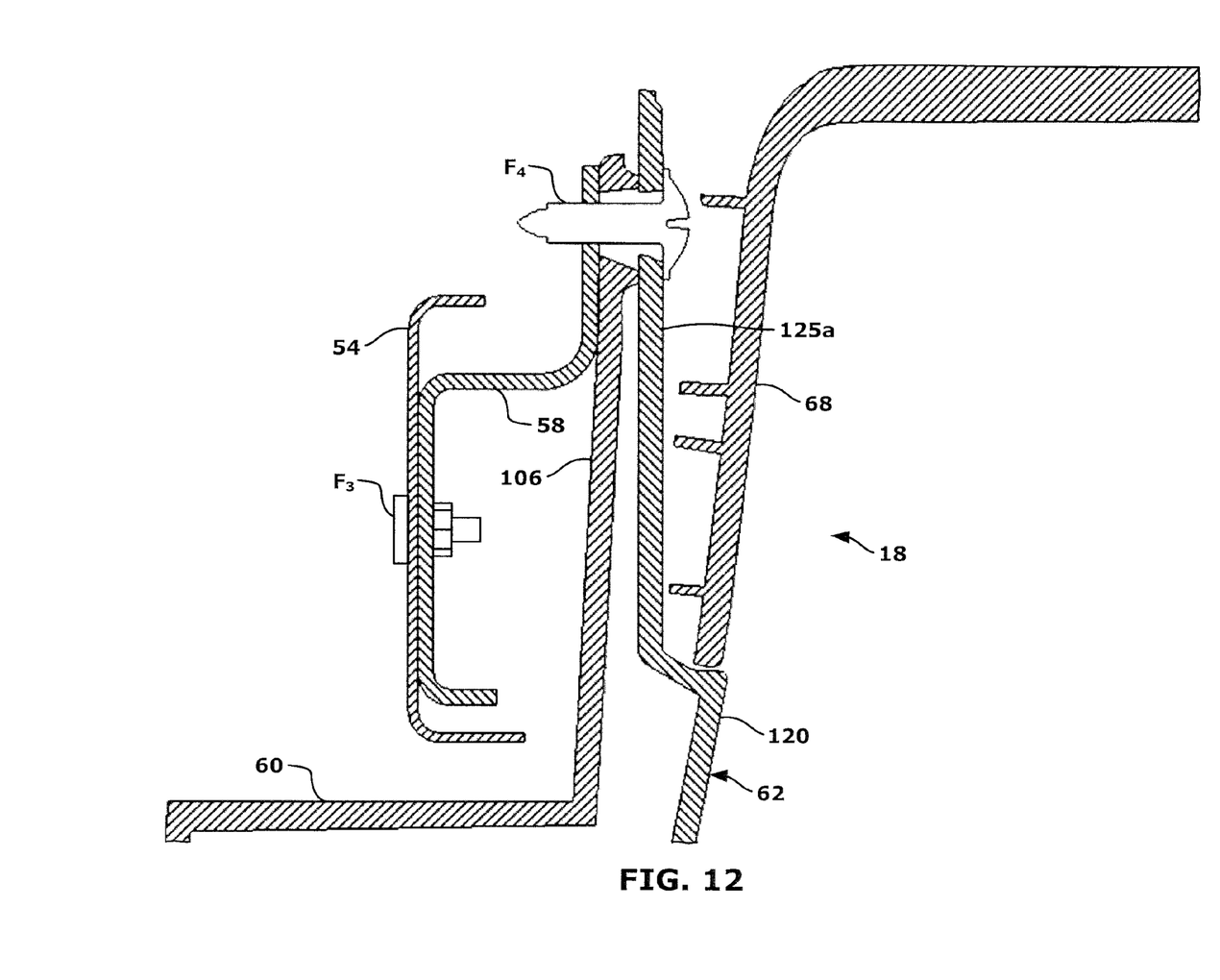
FIG. 12 is another cross-sectional view of the cantilevered section taken along the line 12-12 in FIG. 10 showing connections between the reinforcement member, one of the stay brackets and one of the trim components in accordance with the one embodiment.

The trim component 64 includes cup holder sections 140 that are dimensioned to mate with the cup holder contoured parts 98 of the reinforcement member 60, as indicated in FIG. 11. More specifically, the cup holder sections 140 (a recessed area) of the trim component 62 is shaped and dimensioned to correspond to and align with the cup holder contoured parts 98 (a recessed area) of the reinforcement member 60 such that the cup holder sections 140 and the cup holder contoured parts 98 together form a pair of cup holders, as indicated in FIG. 11. In other words, the cup holder section 90 (the support portion) of the reinforcement member 60 corresponds in shape and size with the cup holder sections 140 (an upward facing surface and recessed area) of the trim component 64.

The trim component 64 also includes a storage compartment 142 that is dimensioned to be aligned with or is located near the storage aperture 96 of the reinforcement member 60, as indicated in FIG. 11. The storage compartment 142 is depicted as a tray-like compartment that is open at the top. However, it should be understood from the drawings and the description herein that the storage compartment 142 can be provided with any of a variety of shapes and configurations. For example, the storage compartment 142 can be provided with a cover (not shown) and can be deep enough to extend within the storage aperture 96 of the reinforcement member 60. In one embodiment, the storage compartment 142 can be dimensioned to hold several CDs, an electronic audio device, and/or a mobile telephone. However, in the depicted embodiment, the storage compartment 142 is a small tray sufficient to hold change, keys and/or a mobile telephone.

The trim component 66 and 68 are facia elements that are dimensioned to conform to the overall shape of the trim component 62 and an underside of the instrument panel 16. The trim components 66 and 68 include a plurality of snap fitting projections 150 (FIG. 3) that mate with the snap-fit apertures 125*b* in the side sections 120 of the trim component 62 and corresponding snap-fit aperture (not shown) in the instrument panel 16. Thus, the trim components 66 and 68 provide a smooth and appealing transition between the cantilevered section 18 and the instrument panel 16.

Hence, once the trim components 62, 64, 66 and 68 are installed to the reinforcement member 60, the reinforcement member 60 is substantially concealed.

Further, the reinforcement member 60 and the trim components 62, 64, 66 and 68 are dimensioned such that the driver or a passenger of the vehicle 10 can pass around the cantilevered section 18 and easily move into the egress 34 between the seats 32. Thus it is possible for a person to move freely between a space in front of the seats 32 to a space behind the seats 32.

The reinforcement member 60 is cantilevered from the stay brackets 52 and 54 of the structural member 50. Hence, the cantilevered section 18 is spaced apart from the floor 24. Consequently, during vehicle assembly, there is no direct connection between the reinforcement member 60 and the floor 24. This arrangement allows for reduction in build variations (due to tolerances) and provides an increase in fit-and-finish quality. Further, the configuration of the cantilevered section 18 simplifies construction of the interior of the vehicle 10.

The vehicle 10 includes many conventional components that are well known in the art. Since such conventional components are well known in the art, these structures will not be discussed or illustrated in detail herein. Rather, it will be apparent to those skilled in the art from this disclosure that the components can be any type of structure that can be used to carry out the present invention.

General Interpretation Of Terms

In understanding the scope of the present invention, the term. "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, as used herein to describe the above embodiments, the following directional terms: "forward", "rearward", "above", "downward", "vertical", "horizontal", "below" and "transverse" as well as any other similar directional terms refer to those directions for a vehicle equipped with the vehicle interior structural assembly. Accordingly, these terms, as utilized to describe the present invention should be interpreted relative to a vehicle equipped with the vehicle interior structural assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle interior structural assembly, comprising:
    an instrument panel having a main section with a first end and a second end dimensioned to extend laterally between opposing interior side walls of a passenger compartment of a vehicle;
    a structural member extending between the first and second ends of the instrument panel such that the structural member is substantially concealed by the instrument panel;
    a stay bracket having a first end connected to the structural member, the stay bracket extending downward from the structural member, the stay bracket extending rearward of the structural member; and
    a reinforcement member connected to the stay bracket at a first point and a second point that are vertically spaced from one another, the reinforcement member including a support portion cantilevered from and extending rearward of the main section of the instrument panel such that forces applied to the reinforcement member are directed to the stay bracket and the structural member, the reinforcement member being centrally located with respect to a lateral width of the passenger compartment of the vehicle.

2. The vehicle interior structural assembly according to claim 1, wherein
a distal end of the reinforcement member extends at least partially between front seats of the vehicle.

3. The vehicle interior structural assembly according to claim 1, wherein
a distal end of the reinforcement member extends at least partially rearward of a rearmost extent of a steering wheel within the passenger compartment of the vehicle.

4. The vehicle interior structural assembly according to claim 1, wherein
the reinforcement member is free from contact with a floor surface of the passenger compartment of the vehicle.

5. The vehicle interior structural assembly according to claim 4, wherein
the stay bracket is free from contact with the floor surface of the passenger compartment of the vehicle.

6. The vehicle interior structural assembly according to claim 1, further comprising
a trim component that substantially conceals the reinforcement member.

7. The vehicle interior structural assembly according to claim 6, wherein
an upward facing surface of the trim component includes a recessed area that is located above the support portion of the reinforcement member.

8. The vehicle interior structural assembly according to claim 7, wherein
the recessed area of the trim component is dimensioned to receive and support a beverage container.

9. The vehicle interior structural assembly according to claim 7, wherein
the recessed area of the trim component is configured and arranged as a storage compartment.

10. The vehicle interior structural assembly according to claim 7, wherein
the reinforcement member corresponds in shape and size with the upward facing surface and the recessed area of the trim component.

11. The vehicle interior structural assembly according to claim 6, wherein
the reinforcement member corresponds in shape and size with an upward facing surface of the trim component.

12. The vehicle interior structural assembly according to claim 1, wherein
an upward facing surface of the reinforcement member includes the support portion and a transverse brace that is spaced apart from the support portion.

13. A vehicle interior structural assembly, comprising:
an instrument panel having a main section with a first end and a second end dimensioned to extend laterally between opposing interior side walls of a passenger compartment of a vehicle;
a structural member extending between the first and second ends of the instrument panel such that the structural member is substantially concealed by the instrument panel;
a stay bracket having a first end connected to the structural member, the stay bracket extending downward from the structural member, the stay bracket extending rearward of the structural member; and
a reinforcement member connected to the stay bracket at a first point and a second point that are vertically spaced from one another, the reinforcement member includes including a truss portion and a support portion, the truss portion extending from a lower of the first and second points to a distal end of the support portion, the support portion being cantilevered from and extending rearward of the main section of the instrument panel such that forces applied to the reinforcement member are directed to the stay bracket and the structural member.

14. The vehicle interior structural assembly according to claim 1, wherein
the reinforcement member includes a mounting extension that connects to the stay bracket at the first and second points, and wherein the mounting extension is located outboard of the stay bracket.

15. The vehicle interior structural assembly according to claim 1, further comprising a plurality of fastener parts for connecting the reinforcement member to the stay bracket at the first and second points, wherein the plurality of fastener parts are oriented parallel to the structural member.

16. A vehicle interior structural assembly, comprising:
a vehicle passenger compartment having a pair of opposing interior side walls and a floor;
a pair of seats attached to the floor, the seats being spaced apart from one another defining an egress therebetween open to an area behind the seats; and
an instrument panel including a main section and a cantilevered section, the main section having a first end and a second end extending laterally between the interior side walls of the vehicle passenger compartment, the cantilevered section extending rearwardly from a central portion of the main section of the instrument panel into at least a portion of the egress between the seats, the cantilevered section being spaced apart from the floor and dimensioned to allow passage between each of the seats and the egress between the seats.

17. The vehicle interior structural assembly according to claim 16, further comprising:
a structural member that extends between the interior side walls and the first and second ends of the instrument panel such that the structural member is substantially concealed by the instrument panel and is spaced apart from the floor.

18. The vehicle interior structural assembly according to claim 17, further comprising:
a stay bracket having a first end connected to the structural member, the stay bracket extending downward from the structural member, the stay bracket extending rearward of the structural member; and
a reinforcement member connected to the stay bracket at a first point and a second point that are vertically spaced from one another, the reinforcement member including a support portion cantilevered from and extending rearward of the main section of the instrument panel such that forces applied to the reinforcement member are directed to the stay bracket and the structural member.

19. The vehicle interior structural assembly according to claim 18, wherein the cantilevered section is supported by the reinforcement member and conceals the reinforcement member.

20. The vehicle interior structural assembly according to claim 16, wherein an upward facing surface of the cantilevered section includes a recessed area that is configured and arranged as a storage compartment.

* * * * *